United States Patent
Dahan

(10) Patent No.: US 9,733,363 B2
(45) Date of Patent: Aug. 15, 2017

(54) FILTERING FOR GLOBAL POSITIONING SYSTEM (GPS) RECEIVERS

(71) Applicant: INTEL IP CORPORATION, Santa Clara, CA (US)

(72) Inventor: Tomer Dahan, Modiin (IL)

(73) Assignee: Intel IP Corporation, Santa Clara, CA (US)

( * ) Notice: Subject to any disclaimer, the term of this patent is extended or adjusted under 35 U.S.C. 154(b) by 634 days.

(21) Appl. No.: 14/128,022

(22) PCT Filed: Sep. 30, 2013

(86) PCT No.: PCT/US2013/062728
§ 371 (c)(1),
(2) Date: Dec. 20, 2013

(87) PCT Pub. No.: WO2015/047417
PCT Pub. Date: Apr. 2, 2015

(65) Prior Publication Data
US 2015/0091750 A1    Apr. 2, 2015

(51) Int. Cl.
*G01S 19/40*    (2010.01)
*G01S 19/39*    (2010.01)
(Continued)

(52) U.S. Cl.
CPC .............. *G01S 19/39* (2013.01); *G01S 19/25* (2013.01); *G01S 19/43* (2013.01)

(58) Field of Classification Search
None
See application file for complete search history.

(56) References Cited

U.S. PATENT DOCUMENTS 5,379,224 A * 1/1995 Brown ................. G01S 5/0009
340/989
2002/0177950 A1   11/2002 Davies
(Continued)

FOREIGN PATENT DOCUMENTS

WO    2005071431    8/2005

OTHER PUBLICATIONS

International Search Report and Written Opinion, dated Jun. 17, 2004, PCT/ISA/210, PCT/ISA/220, PCT/ISA/237.
(Continued)

*Primary Examiner* — Sean P Burke
(74) *Attorney, Agent, or Firm* — Schwegman Lundberg & Woessner, P.A.

(57) ABSTRACT

Devices and methods are directed to estimating a position of the device/user using a delta range measurement (DRM) module to measure a range difference between first and second range values for first and second time instants based on, e.g., carrier phase measurements. The time period between the first and second time instants may be greater than a periodic interval at which a new phase value is sampled. This architecture of the DRM module provides extended delta ranges values which also overlap in time, enabling a combination of improved dilution of precision and keeping fast generation of delta range values suitable for use in continuous filtering. A filter, e.g., a Kalman filter, may be used compute current estimates of two positions, or a combination of a position and a position difference, of the device based at least on the range difference and a priori estimate(s) of the position(s) of the device.

20 Claims, 5 Drawing Sheets

(51) Int. Cl.
  *G01S 19/25* (2010.01)
  *G01S 19/43* (2010.01)

(56) References Cited

U.S. PATENT DOCUMENTS

| | | | |
|---|---|---|---|
| 2006/0195262 A1* | 8/2006 | Draganov | G01S 19/47 |
| | | | 701/472 |
| 2008/0036651 A1* | 2/2008 | van Diggelen | G01S 5/0018 |
| | | | 342/357.25 |
| 2012/0265440 A1 | 10/2012 | Morgan | |

OTHER PUBLICATIONS

International Preliminary Report on Patentability dated Apr. 14, 2016 in corresponding International Patent Application No. PCT/US2013/062728 (10pages).

* cited by examiner

FILTERING FOR GLOBAL POSITIONING SYSTEM (GPS) RECEIVERS

This disclosure relates generally to the field of global positioning systems (GPS), and in particular, to filtering techniques to estimate positions in GPS receivers.

BACKGROUND

Typical methods for delta range positioning, e.g., using carrier phase measurements, for standard moving or dynamic GPS devices, use a delta range interval of one second, which coincides with the typical update step of the conventional Kalman filter states of user velocity and position.

DETAILED DESCRIPTION

Figure 1:
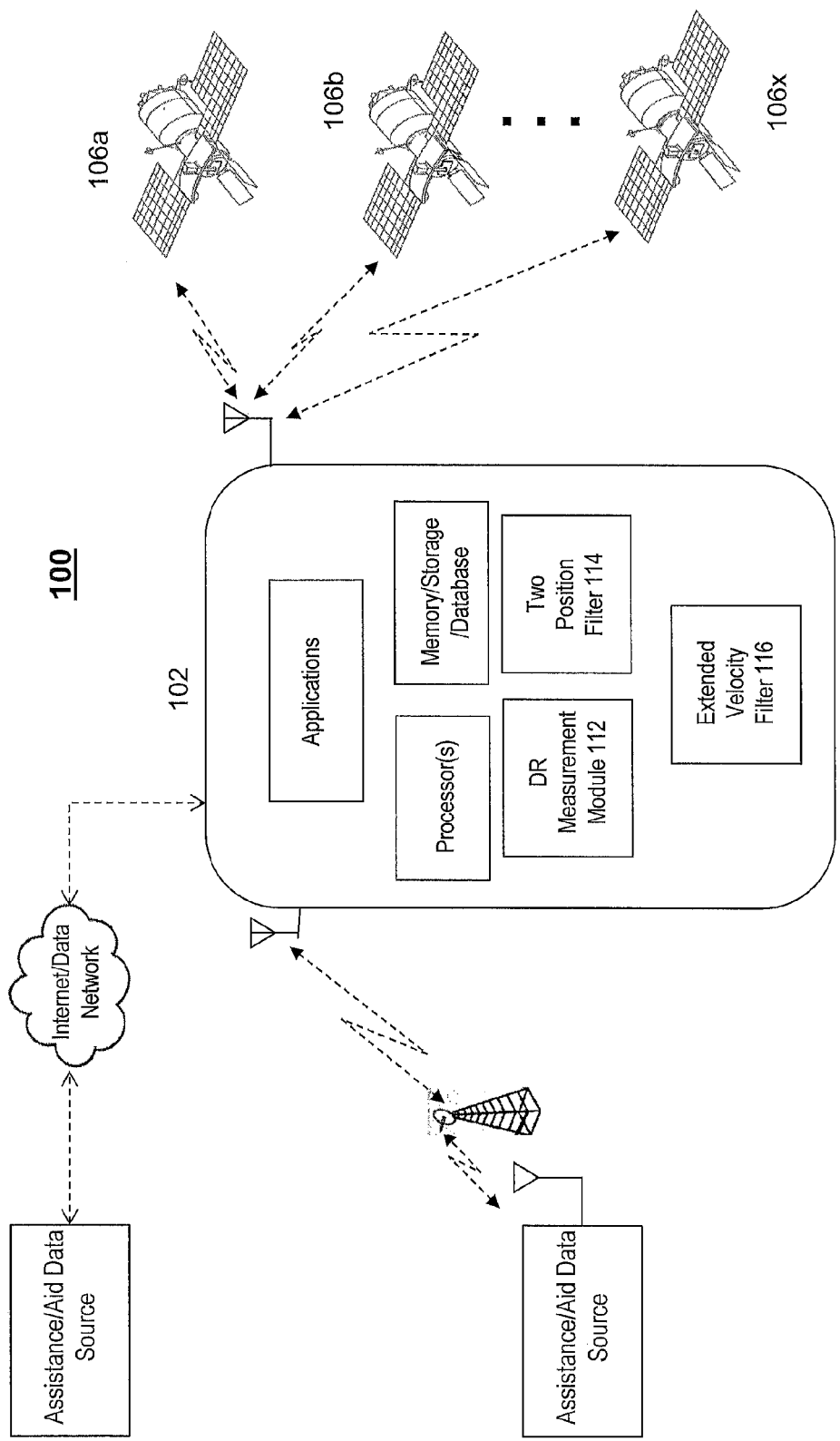
FIG. 1 depicts an overview of a location/position estimation information system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various aspects and embodiments of instant disclosure, a measurement model for delta ranges and filters (or filtering techniques) are described. A delta range or a range difference value may be measured based on carrier signal phase values, which are related to have a time period longer or extended (e.g., by N epochs or time instants) than a typical time period (e.g., one second) for delta range measurement. As such, a delta range in accordance with various embodiments may be considered as an "extended delta range." Further, the delta range may be "time-overlapped" in that the range or phase values may be stored in a shift register, and then accessed from the shift registers as delayed phase values for delta range computation. The shift register may be updated each epoch (e.g., one second), with a new phase measurement from a PLL, thus computing and supplying delta ranges to a filter at a regular update rate of, e.g., one second.

Further, in accordance with various embodiments, filters or filtering techniques may be based on a Kalman filter or filtering technique, but the states associated with the filter may be different than the typical position and velocity states used in a Kalman filter for a GPS receiver. For example, a filter with two positions states, or a position state and an extended velocity state may be used. Such a filter may include or be associated with shift registers to store a plurality of a posteriori state values and shift registers to store a posteriori error covariance values, and which shift registers are propagated each epoch or each estimation cycle of the filter. Such delta range measurement model and filters have may show improved performance over the conventional filter, which uses an interval of one second, and states which coincide with the conventional user velocity and a single position.

In accordance with one aspect of this disclosure, what is proposed is a device that includes a delta range measurement (DRM) module and a filter. The DRM module may be configured to measure a range difference value between a first range value related to a first time instant and a second range value related to a second time instant, wherein the first and second range values indicate spatial relationships between the device and a navigation satellite at respectively the first and second time instants. The time period between the first time instant and the second time instant (e.g., N epochs or seconds) may be greater than a periodic interval at which a range value is updated (e.g., equal to one epoch or second). Further, the range difference value may be based at least on a difference of a phase of a carrier signal associated with the satellite at the first time instant and the phase of the carrier signal at the second time instant. The phases of the carrier signal determined at a plurality of consecutive time instants may be stored in a shift register. The periodic interval at which the range value is updated may include a periodic interval at which a new phase of the carrier signal is sampled, and the time period between the first time instant and the second time instant is greater than the periodic interval at which a new phase of the carrier signal is sampled.

The filter may be configured to compute, for a first (estimation or filtering) cycle, a current estimate of a position of the device based at least on the range difference value and a previous estimate of the position of the device. For example, for the first cycle, the filter may compute a current estimate of a first position of the device and a current estimate of a second position of the device, based at least on the range difference value and a priori estimates of the first and second positions and a line-of-sight (LOS) distance vector (i.e., the LOS distance and angle) between the satellite and the first position and/or a LOS distance vector between the satellite and the second position. The filter may also utilize a priori estimates of error covariance related to the first and second positions to compute the first and second position current estimates, and provide current estimates of the error covariance related to the first and second positions.

In another example, for the first cycle, the filter is configured to compute a current estimate of a position difference between a first position of the device and a second position of the device, and a current estimate of the second position of the device, based at least on the range difference value and a priori estimates of the position difference and the second position and a line-of-sight (LOS) distance vector between the satellite and the first position and/or a LOS distance vector between the satellite and the second position. The filter may compute the current estimate of the position difference and the current estimate of the second position further based on a priori estimates of error covariance related to the position difference and the second position.

The filter may be further configured to provide current estimates of the error covariance related to the position difference and the second position.

In another aspect of this disclosure, a method is presented which may be implemented or executed by a processor, and the method may include measuring a range difference value between a first range value related to a first time instant and a second range value related to a second time instant, wherein the first and second range values indicate spatial relationships between the device and a navigation satellite at respectively the first and second time instants. The time period between the first time instant and the second time instant may be greater than a periodic interval at which a range value is updated. The range difference value may be based at least on a difference of a phase of a carrier signal associated with the satellite at the first time instant and the phase of the carrier signal at the second time instant. The phases of the carrier signal determined at a plurality of consecutive time instants may be stored in a shift register. The periodic interval at which the range value is updated may include a periodic interval at which a new phase of the carrier signal is sampled, and the time period between the first time instant and the second time instant is greater than the periodic interval at which a new phase of the carrier signal is sampled.

The method may further include computing, for a first estimation cycle, a current estimate of a position of the device based at least on the range difference value and an a priori estimate of the position of the device. For example, for the first estimation cycle, the computing of a current estimate may include computing a current estimate of a first position of the device and a current estimate of a second position of the device, wherein the first and second position current estimates are computed based at least on the range difference value and a priori estimates of the first and second positions.

In another example, for the first estimation cycle, the computing of a current estimate may include computing a current estimate of a position difference between a first position of the device and a second position of the device, and a current estimate of the second position of the device, wherein the current estimate of the position difference and the current estimate of the second position are computed based at least on the range difference value and a priori estimates of the position difference and the second position.

According to another aspect of the present disclosure, a computer-readable medium including computer-executable instructions is provided. The instructions when executed by a processor cause the processor to implement one or more methods and/or device functionalities presented in this disclosure.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

FIG. 1 depicts an overview of position estimation and tracking system 100, in accordance with various aspects and principles of the present disclosure. The architecture of system 100 includes a wireless device 102, and a plurality of assistance/aid-data sources storing location-related assistance/aid information that are configured to communicate with device 102 using radio-frequency (RF) signals or via a data network, e.g., an Internet Protocol (IP)-based network such as the Internet. In some embodiments, one or more of the aid-data sources may be part of and deployed within one or more cellular networks, which provide location-based services to their subscribers/users using data from the aid-data sources. Additionally, in system 100, device 102 and the aid-data sources may be able to communicate with a GPS satellite or a constellation of GPS satellites $106a$-$106x$ ("satellite 106") to receive RF signals having position/location-related information, based on which device 102 may be able to compute its position (e.g., for a location-based service and application), as needed. In general, system 100, its components and the location-based services and applications executed therein may be relate to global-navigation-satellite-systems and global positioning systems, e.g., GNSS, GPS, GLONASS, Galileo, COMPASS, BEIDOU, etc., assistance-based satellite/positioning systems, e.g., secure user plane location (SUPL) systems, and/or different augmentation systems, e.g., satellite-based augmentation system (SBAS), etc.

In the context of this disclosure, an assistance or aid-data source may include any device or apparatus that is capable of storing and providing (to wireless devices) location-and-time-related information of an associated (cellular) network and/or one or more satellites (e.g., ephemeris information of satellite(s) 106). In some embodiments, a source may be a part of and deployed within a wireless network (e.g., a Global System for Mobile Communications (GSM) network, a General packet radio service (GPRS) network, a third-generation (3G) network, a fourth-generation (4G) network including an Long-Term-Evolution (LTE) network or a WiMAX network, a Wi-Fi network, or any other cellular/wireless network) which provides location-based services to their subscribers/users using assistance data and satellite(s) 106. As such, the aid-data source of system 100 may be implemented as an assisted-GPS (A-GPS) or assisted-GNSS (A-GNSS) server (hereinafter referred to as "A-GPS server") in the cellular network which receives, monitors, processes and stores the GPS signals from satellites 106 through a reference GPS receiver (not shown) integrated with the A-GPS server.

In some embodiments, the location-related assistance information includes reference (or coarse or raw) location information, reference (or coarse or raw) time information based on the network time, GPS date and time information, orbital information (e.g., ephemeris data) of a satellite, reference and status information (e.g., almanac-orbital location and pseudorandom binary sequence (PN or PRN codes) of a set of satellites, Ionospheric parameters, or a combination thereof.

In the context of this disclosure, device 102 refers to any device that may communicate with other devices via wireless signals, and may wirelessly (or via a wired network) connect to and communicate with aid-data sources and satellites 106. Such devices may include a positioning device (e.g., having a GPS receiver) and may be implemented as or within, e.g., a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to communicate wireless signals including location-related signals.

As such, device 102 may be configured with variety of components, such as, for example, processor(s), memories, display screen, camera, input devices as well as communication-based elements. The communication-based elements may include, for example, antenna, interfaces, transceivers, modulation/demodulation and other circuitry, configured to communicate and transmit/receive information via a wireless or wired connection. The communication-based elements may be configured to support various network technologies and protocols including, but not limited to, GSM, GPRS, CDMA, WCDMA, 3G, 4G (LTE or WiMAX), Bluetooth, positioning/navigational (GPS) technologies, Wi-Fi, Ethernet, near-field communication (NFC), and/or other network technologies and protocols. Device 102 may also include a bus infrastructure and/or other interconnection means to connect and communicate information between various components and communication elements noted above.

The processor(s) of device 102 (and/or of other system components) may be part of a core processing or computing unit that is configured to receive and process input data, signals and instructions, provide output and/or control other components of device 102 in accordance with embodiments of the present disclosure. Such processing elements may include a microprocessor, a memory controller, a memory and other components. The microprocessor may further include a cache memory (e.g., SRAM), which along with the memory may be part of a memory hierarchy to store instructions and data. The microprocessor may also include one or more logic modules such as a field programmable gate array (FPGA) or other logic array.

The memories of device 102 (and/or of other components of system 100) may take the form of a dynamic storage device coupled to the bus infrastructure and configured to store information, instructions, and application programs to be executed by the processor(s) or controller(s) associated of the respective device/component. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Device 102 (and/or other system components) may also include read only memory (ROM) and/or other static storage devices coupled to the bus infrastructure and configured to store static information and instructions for the processor(s) and/or controller(s) associated with the device/component.

In some embodiments, device 102 may support applications (executing of the device itself or on other connected devices) that may require and use location/position of device 102. As such, device 102 may be configured to receive a position request from such an application, process the request, compute the device position, and provide the position information to the application. In some embodiments, to process the position request and determine the position, device 102 communicates with one or more of the aid-data source (e.g., A-GPS servers) to obtain location-related assistance data. Device 102 may then utilize the assistance data from the multiple sources to improve the tracking and acquiring of satellite(s) 106 to obtain accurate satellite signals needed for the position calculation. Using the assistance data from multiple sources, device 102 may be able to improve its performance in determining the requested position information in terms of: (a) reduced time delay to acquire satellite signals and navigation data and compute the position fix (also known as time-to-first-fix (TTFF)), (b) more accurate position information calculated based on the assistance data and satellite data, (c) better sensitivity to acquire satellite signals in "noisy" conditions, and/or (d) acquiring satellite signals and navigation data from additional satellites, etc.

Further, in some embodiments, to determine the location/position of device 102 or its user, device 102 includes and utilizes a delta range measurement (DRM) module 112, a two-position filter 114 and an extended velocity filter 116. The modules 112, 114, 116 may be a part of or be operatively associated with a GPS receiver of device 102. In general, DRM module 112 may be configured to compute a range difference value or a "delta range" (DR) between two range values of device 102 determined or measured at different epochs or time instants, e.g., for a moving user of device 102. A range value is defined as a distance (or any other spatial relationship) between a GPS receiver (in device 102) and a satellite vehicle (SV) 106 at a given point in time. DRM module 112 may determine (separately for each SV 106) a DR value between a first range value related to a first time instant and a second range value related to a second time instant. In some embodiments, the time period or interval elapsed between the first time instant and the second time instant, i.e., "delta range interval" (e.g., equal to N epochs or seconds) is greater than a periodic interval at which a range value is updated or a new range value is determined (e.g., at a typical range update rate of one epoch or second). In some embodiments, the range values are defined in terms of phase values of a carrier signal associated with the satellite 106 determined and provided to DRM module 112 by a phase locked loop (PLL) associated with device 102 or the GPS receiver therein. The range values may further be based on a wavelength of the carrier signal.

Figure 2:
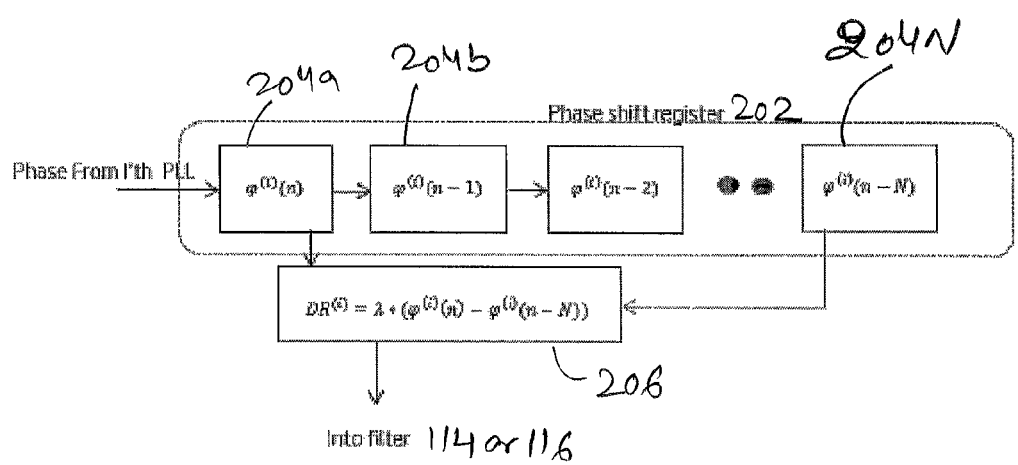
FIG. 2 illustrates a block diagram an exemplary delta range measurement module, in accordance with various aspects and principles of the present disclosure.

Referring now to FIG. 2, which illustrates a block diagram an exemplary DRM module 112, in accordance with various embodiments. As shown, DRM module 112 includes a shift register 202 having multiple flip-flops 204a-204N (or individual data storage units) to store N phase values (N being greater than 1) associated with $i^{th}$ satellite 106 received from $i^{th}$ tracking PLL. As with a typical operation of a shift register, at every periodic update step (e.g., every one second), a new phase value is input from the PLL to shift register to be replace the stored phase value at unit 204a, and the existing phase value of each of other units 204 are replaced with the phase value of the unit to the left. As such, the phase value $\phi(n)$ in unit 204a represents the most current phase value for the current phase update or sampling step, and n represents the time index for the current update step. Similarly, the phase values $\phi(n-1)$ to $\phi(n-N)$ in respectively units 204b-204N represent previously determined phase values during prior phase update or sampling steps, where n-1 represents the time index for the update step immediately prior to the nth step and n-N represents the time index for the update step N steps prior to the nth step.

In some embodiments, to determine a delta range (DR) value with respect to $i^{th}$ satellite 106 at each update step (e.g., with a period of one second), the current phase measurement ($\phi,(n)$) is subtracted from a lagged or delayed phase value from N update steps ago ($\phi,(n-N)$), producing a new DR measurement for filter 114 or 116. For example, the DR measurement at DR unit 206 may be represented by eq. (1) below:

$$DR^{(i)} = \lambda * (\phi^{(i)}n - \phi^{(i)}(n-N)) \quad (1)$$

where, $\lambda$ is the wavelength of the carrier signal. The length of the shift register, i.e., N, is equal to the size of the delta range interval, and as such, the delta range interval is greater than the phase update period. Such extension of the delta range interval may yield a dilution of precision (DOP) improvement, without modifying a typical DR measurement rate (of, e.g., one second).

Following is a derivation of eq. (1)—the rate of change of phase (tracked by a PLL) equals to the sum of the Doppler Effect and the frequency deviation between the demodulator frequency at the receiver and the frequency of the observed carrier. This phase rate of change is expressed as in eq. (2) below:

$$\frac{d\varphi(t)}{dt} \frac{1}{\lambda} * V(t) * LOS(t) + (F_r(t) - F_t(t)) \quad (2)$$

where,
V(t)—velocity of the user
LOS(t)—line of sight unit vector pointing from user to SV
$\lambda$—carrier wavelength
$F_r(t)$—demodulator frequency at the receiver
$F_t(t)$—frequency of the observed carrier.

Further, eq. (2) is integrated from time $T_a$ to $T_b$ for $i^{th}$ satellite 106 as presented in eq. (3) below:

$$\varphi_A^{(i)}(t_a) - \varphi_B^{(i)}(t_b) = \frac{1}{\lambda} \int_{t_a}^{t_b} V(t) * LOS^{(i)}(t) \, dt =$$

$$\frac{1}{\lambda}(\|P_{sv}^{(i)} - X_A\| - \|P_{sv}^{(i)} - X_B\|) + Bias^{(i)} = \frac{1}{\lambda}(DR^{(i)}) + Bias^{(i)} \quad (3)$$

where, A and B are the two time instants for which the phase difference and as such, the delta range (DR) is computed; $P_{sv}$ is the position of $i^{th}$ satellite 106; $X_A$ and $X_B$ represent positions of device 102 at time instants A and B, respectively; and Bias may depend on the frequency drift of the receiver (if frequency of the carrier is stable and equal for all satellites 106). From the above eq. (3), DR can be defined as in eq. (4):

$$DR^{(i)} = \|P_{sv}^{(i)} - X_A\| - \|P_{sv}^{(i)} - X_B\| = \text{range difference between the epochs.} \quad (4)$$

And, as such, from eq. (3), it is clear that DR may be computed as in eq. (1), i.e. as a product of the carrier wavelength and the phase difference of phases at two time instants.

In some other embodiments, in addition to or instead of determining a DR value based on the difference of the current phase and phase from N updates ago, DRM module 112 is configured to determine one or more other DR values based on the difference of the current phase and one or more other phase values. For example, DRM module 112 may include other DR unit(s) 206 to compute DR values based on ($\phi(n)-\phi(n-1)$), ($\phi(n)-\phi(n-2)$), . . . , ($\phi(n)-\phi(n-N-1)$). One, some or all of these DR values may then be provided to filter 114 or 116 to compute the device position.

Referring back to FIG. 1, two position filter 114 and/or extended velocity filter 116 may be configured as a Kalman filter using a linear quadratic estimation (LQE) that uses a series of measurements observed over time, e.g., delta range measurements (from DRM module 112) and previously computed or a priori position (or coordinates) estimates containing noise (random variations) and other inaccuracies. Using these a priori position estimates, the filter may produce current estimates of coordinates of the location(s) of device 102 or its user, that tend to be more precise than those based on a single measurement alone. In general, filter 114 or 116 may operate recursively on streams of noisy input data (e.g., DR measurements) to produce a statistically optimal estimate of the variables, e.g., position coordinates.

Figure 3:
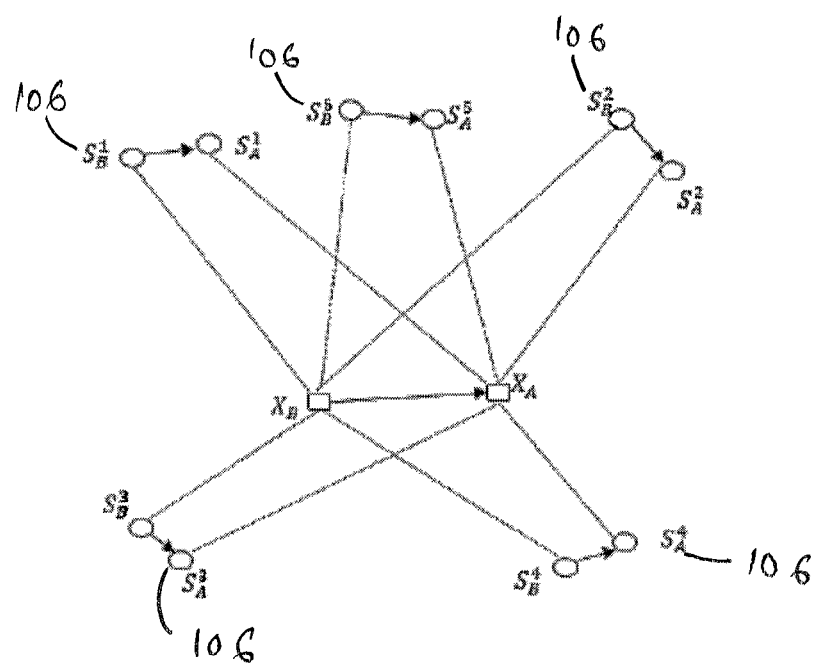
FIG. 3 depicts an example of geometrical relationships between user's positions and moving satellites at different times, in accordance with various aspects and principles of the present disclosure.

With respect to the operation of two position filter 114 as a Kalman filter, the two positions $X_A$ and $X_B$ are the two "states" which are continuously estimated (and updated) by the filter 114. For filter 114's operation, we consider, as a non-limiting embodiment, that the user location/position is determined using two dimensional coordinates, and DR measurements between device 102 and each of five satellites 106 (as computed by one or more DRM modules 112) are involved in determining user position(s) using filter 114. To that end, FIG. 3 depicts an example of geometrical relationships between positions $X_A$ and $X_B$ (at time instants A and B, respectively) for a moving user and corresponding locations of five moving satellites, $S^1$-$S^5$, also at time instants A and B. The time interval between the time instants A and B is known as DR interval (denoted as N). As shown by arrow directions in FIG. 3, it is considered here that the user and the satellites are moving from the time instant B to time instant A. In some embodiments, position at time instant B (i.e., $X_B$) for a current DR measurement is the position at time A (i.e., $X_A$) done N time instants prior. In other words, $X_B$ is considered equal to N-time-instants delayed version of $X_A$. The user may be a walking pedestrian user or a user in a moving vehicle.

Following is a description of a mathematical structure based on which filter 114 is able to compute estimates of user positions ($X_A$ and $X_B$), for a current estimation cycle or iteration of the filter, using current DR measurements from DRM module(s) 112 and a priori estimates of the user positions computed in prior estimation cycle(s) of the filter (which is interchangeably referred to as "previous estimates" in this disclosure).

Observation equations related to DR measurements are as presented below:

$$\|S_A^1 - X_A\| - \|S_B^1 - X_B\| + Bias = DR_1$$

$$\|S_A^2 - X_A\| - \|S_B^2 - X_B\| + Bias = DR_2$$

$$\|S^3 - X_A\| - \|S^3 - X_B\| + Bias = DR_3$$

$$\|S^4 - X_A\| - \|S^4 - X_B\| + Bias = DR_4$$

$$\|S^5 - X_A\| - \|S^5 - X_B\| + Bias = DR_4 \quad (5)$$

Position coordinates (in two dimensions x and y) for time instants A and B are defined as follows:

$$\begin{bmatrix} x_x^A \\ x_y^A \\ x_x^B \\ x_y^B \\ x_d \end{bmatrix} = \begin{bmatrix} x \text{ coordinate of position } A \\ y \text{ coordinate of position } A \\ x \text{ coordinate of position } B \\ y \text{ coordinate of position } B \\ \text{Clock drift} \end{bmatrix}$$

where, individual user positions are defined as:

$$X_A = \begin{bmatrix} x_x^A \\ x_y^A \end{bmatrix}; X_B = \begin{bmatrix} x_x^B \\ x_y^B \end{bmatrix}; dX_A = \begin{bmatrix} dx_x^A \\ dx_y^A \end{bmatrix}; dX_B = \begin{bmatrix} dx_x^B \\ dx_y^B \end{bmatrix}$$

$dX_A$ and $dX_B$ represent the (to-be-determined) amount of change in the estimated values for position $X_A$ and $X_B$, respectively, from one estimation cycle (or iteration) of filter 114 to the next. And, "Clock drift," $X_d$ (or $X_b$ eqs. 8m 9 below) indicates an unknown drifting receiver clock assumed during the DR measurement interval.

Position coordinates of the $i^{th}$ satellite 106 at time instants is defined as:

$$S_A^{(i)} = \begin{bmatrix} S_{A_x}^{(i)} \\ S_{A_y}^{(i)} \end{bmatrix}; S_B^{(i)} = \begin{bmatrix} S_{B_x}^{(i)} \\ S_{B_y}^{(i)} \end{bmatrix}$$

Line-of-sight (LOS) vectors from $i^{th}$ satellite 106 to position $X_A$ and to position $X_B$ are defined as in eqs. (6) and (7) below:

$$LOS_A^{(i)} = \frac{(S_A^{(i)} - X_A)}{\|S_A^{(i)} - X_A\|} = \begin{bmatrix} \frac{(S_{A_x}^{(i)} - x_x^A)}{\|S_A^{(i)} - X_A\|} & \frac{(S_{A_y}^{(i)} - x_y^A)}{\|S_A^{(i)} - X_A\|} \end{bmatrix} \quad (6)$$

$$LOS_B^{(i)} = \frac{(S_B^{(i)} - X_B)}{\|S_B^{(i)} - X_B\|} = \begin{bmatrix} \frac{(S_{B_x}^{(i)} - x_x^B)}{\|S_B^{(i)} - X_B\|} & \frac{(S_{B_y}^{(i)} - x_y^B)}{\|S_B^{(i)} - X_B\|} \end{bmatrix} \quad (7)$$

DR observation eq. (5) is linearized to obtain a solution for unknown delta position parameters ($dX_A$ and $dX^B$), and the linearization is expressed in eq. (8) below:

$$\begin{bmatrix} LOS_A^1 & -LOS_B^1 & 1 \\ LOS_A^2 & -LOS_B^2 & 1 \\ LOS_A^3 & -LOS_B^3 & 1 \\ LOS_A^4 & -LOS_B^4 & 1 \\ LOS_A^5 & -LOS_A^5 & 1 \end{bmatrix} \begin{bmatrix} \begin{bmatrix} dx_x^A \\ dx_y^A \end{bmatrix} \\ \begin{bmatrix} dx_x^B \\ dx_y^B \end{bmatrix} \\ dx_b \end{bmatrix} = \begin{bmatrix} dz^{(1)} \\ dz^{(2)} \\ dz^{(3)} \\ dz^{(4)} \\ dz^{(5)} \end{bmatrix} \quad (8)$$

where, LOS vectors in eq. (8) are computed using eqs. (6) and (7). dZ is the residual vector representing the difference between the measured DR provided by DRM module 112 and an estimated DR measurement. The linearized residual dZ (i.e., the right hand side of eq. (8)) is calculated according to eq. (9) below:

$$dz^{(i)} = DR_{meas}^{(i)} - DR_{est}^{(i)} = DR_{meas}^{(i)} - [LOS_A^{(i)} \quad -LOS_B^{(i)} \quad 1] \begin{bmatrix} X_A^{(-)} \\ X_B^{(-)} \\ x_b \end{bmatrix} \quad (9)$$

Thus, as is clear from eq. (9), the residual vector dZ is computed based on the measured DR from DRM module 112, LOS vectors (computed using eqs. (6) and (7)), and a priori estimates of positions $X_A$ and $X_B$, i.e., $X_A^{(-)}$ and $X_B^{(-)}$. The a priori estimates are the positions estimates computed by filter 114 in a previous estimation cycle or iteration (e.g., from the immediate prior iteration and/or from iterations ago). The a priori position estimates for a plurality of (prior) consecutive cycles or iterations may be stored in a shift register, and accessed from the shift register during each estimation cycle to provide to filter 114, e.g., for use in computing eqs. (8) and (9) above.

For a non-linear operation with respect to iterative filtering technique, the residual vector dZ is computed based on the following eq. (10):

$$dz^{(i)} = DR_{meas}^{(i)} - DR_{est}^{(i)} = DR_{meas}^{(i)} - (\|S^{(i)} - X_A^{(-)}\| - \|S^{(i)} - X_B^{(-)}\| + x_b^{(-)}) \quad (10)$$

Accordingly, using the solution of eqs. (6) and (7) for LOS vectors, and the solution of eq. (9) (or eq. (10)) for the residual vector dZ (and also a priori error covariance estimates related to positions $X_A$ and $X_B$), a solution for eq. (8) is computed within filter 114 to determine the delta or change in the position parameters, i.e., $dX_A$ and $dX_B$. To obtain the solution for eq. (8), filter 114 may utilize the Kalman filter closed-form solution to solve for the current position estimate based on the current LOS vector measurements and a priori position and a priori error covariance estimates, "$P^{(-)}$". Such Kalman filtering based closed-form solution is represented by the "KF set of equations" below:

$$I = HP^{(-)}H^T + R$$

$$K = P^{(-)}H^T I^{-1}$$

$$P^{(+)} = (I - KH)P^{(-)}$$

$$dx = K \ast dz$$

where $$\begin{bmatrix} LOS_A^1 & -LOS_B^1 & 1 \\ LOS_A^2 & -LOS_B^2 & 1 \\ LOS_A^3 & -LOS_B^3 & 1 \\ LOS_A^4 & -LOS_B^4 & 1 \\ LOS_A^5 & -LOS_A^5 & 1 \end{bmatrix}$$

represents "H".

Further, filter 114 then uses the determined $dX_A$ and $dX_B$ parameters to update the previous or a priori position estimates $X_A^{(-)}$ and $X_B^{(-)}$, and obtain (final) a posteriori or "current" position estimates, $X_A^{(+)}$ and $X_B^{(+)}$ for the current estimation cycle or iteration.

Eq. (11) below represents this update operation.

$$X_A^{(+)} = X_B^{(-)} + dX_A$$

$$X_B^{(+)} = X_B^{(-)} + dX_B \quad (11)$$

In a continuous filtering operation such as in filter 114 (and in filter 116 described below), a temporal propagation relation between the filter states of successive iterations may be established. To establish a temporal propagation relation for filter 114, it is assumed that the current position $X_B$ is equivalent to position $X_A$ from N epochs or iterations ago. (Each estimation iteration or cycle may be considered as equivalent to one epoch or time instant.) As such, the position estimates of $X_A$ (from eq. (11)) for multiple consecutive iterations (N iterations) may be stored, e.g., in a shift register, and the a posteriori position estimate $X_A$ from the previous $(n-N)^{th}$ iteration may be used as a priori position estimate $X_B$ for $n^{th}$ iteration. The temporal propagation relation for $X_B$ is defined in eq. (12) below:

$$X_B^{(-)}(n) = X_A^{(+)}(n - N) \quad (12)$$

Further, the a priori position estimate $X_A$ to be used in the $n^{th}$ iteration may be propagated from the a posteriori position estimate $X_A$ computed in the $(n-1)^{th}$ iteration. The temporal propagation relation for $X_A$ is defined in eq. (13) below:

$$X_A^{(-)}(n) = X_A^{(+)}(n-1) + q_n \quad (13)$$

where, $q_n$ represents an additive random vector which is a result of the random walk which the user undergoes (or in other words represents process noise). This random vector has an associated covariance matrix $E(q_n q_n^T)$, and the state error covariance propagates due to the random walk as discussed below.

With regard to error covariance propagation, the estimated state vector error for a priori $n^{th}$ iteration is denoted as $$\begin{bmatrix} X_A^{(-)}(n) \\ X_B^{(-)}(n) \end{bmatrix}.$$

And, the a priori error covariance for the $n^{th}$ iteration is defined as in eq. (14):

$$P^-(n) = E\left\{ \begin{bmatrix} X_A^{(-)}(n) \\ X_B^{(-)}(n) \end{bmatrix} \begin{bmatrix} X_A^{(-)}(n) & X_B^{(-)}(n) \end{bmatrix} \right\} = \begin{bmatrix} P_A^{(-)}(n) & P_{AB}^{(-)}(n) \\ P_{AB}^{(-)}(n) & P_B^{(-)}(n) \end{bmatrix} \quad (14)$$

Eqs. (12) and (13) are substituted in eq. (14) to obtain the a priori error covariance in the form expressed in eq. (15)

$$P^-(n) = E\left\{ \begin{bmatrix} X_A^{(+)}(n-1) + q_n \\ X_B^{(+)}(n-N) \end{bmatrix} \begin{bmatrix} X_A^{(+)}(n-1) + q_n & X_A^{(+)}(n-N) \end{bmatrix} \right\} = \quad (15)$$

$$E\left\{ \begin{bmatrix} X_A^{(+)}(n-1) \\ X_A^{(+)}(n-N) \end{bmatrix} \begin{bmatrix} X_A^{(+)}(n-1) & X_A^{(+)}(n-N) \end{bmatrix} \right\} +$$

$$\begin{bmatrix} E(q_n q_n^T) & 0 \\ 0 & 0 \end{bmatrix} =$$

$$\begin{bmatrix} E\{X_A^{(+)}(n-1)X_A^{(+)}(n-1)^T\} & E\{X_A^{(+)}(n-1)X_A^{(+)}(n-N)^T\} \\ E\{X_A^{(+)}(n-1)X_A^{(+)}(n-N)^T\} & E\{X_A^{(+)}(n-N)X_A^{(+)}(n-N)^T\} \end{bmatrix} +$$

$$\begin{bmatrix} E(q_n q_n^T) & 0 \\ 0 & 0 \end{bmatrix}$$

where, elements in the above matrix are all 2×2 submatrices.

A final form of error covariance propagation relationship for propagation of a posteriori error covariance from $(n-1)^{th}$ iteration to a priori error covariance of $n^{th}$ iteration is provided as in the following equation:

$$Q = E\{q_n q_n^T\}$$

$$P^{(-)}(n) = \begin{bmatrix} P_A^{(+)}(n-1) & 0 \\ 0 & P_A^{(+)}(n-N) \end{bmatrix} + \begin{bmatrix} Q & 0 \\ 0 & 0 \end{bmatrix} \quad (16)$$

$$Q = E\{q_n q_n^T\}.$$

In some embodiments, the error covariance obtained from a plurality of consecutive (N) estimation iterations (based on eq. (16)) may be stored in a shift register. For error covariance propagation, the a priori error covariance estimate for position XA to be used in the nth iteration may be propagated from the a posteriori error covariance estimate for position $X_A$ computed in the $(n-N)^{th}$ iteration.

In some embodiments a simpler temporal propagation rule may be adapted than that defined in eq. (16)—which simply adds process noise to both a priori position states. This entails adding process noise component to both position $X_A$ error covariance (upper left sub-matrix in eq. (16)) and position $X_B$ error covariance (bottom right sub-matrix in eq. (16)), instead of propagating (or overwriting) position $X_B$ covariance with the a posteriori error covariance estimate for position $X_A$ computed in the $(n-N)^{th}$ iteration. Such an embodiment may be less optimal in filtering compared to eq. (16), but may be used in applications where the extra memory and processing required by the shift register architecture are considered excessive. In some embodiments the cross correlation terms between position $X_A$ and position $X_B$ in eq. (16) are not zeroed out, but kept intact as a priori statistics for the next delta range measurement update.

Figure 4:
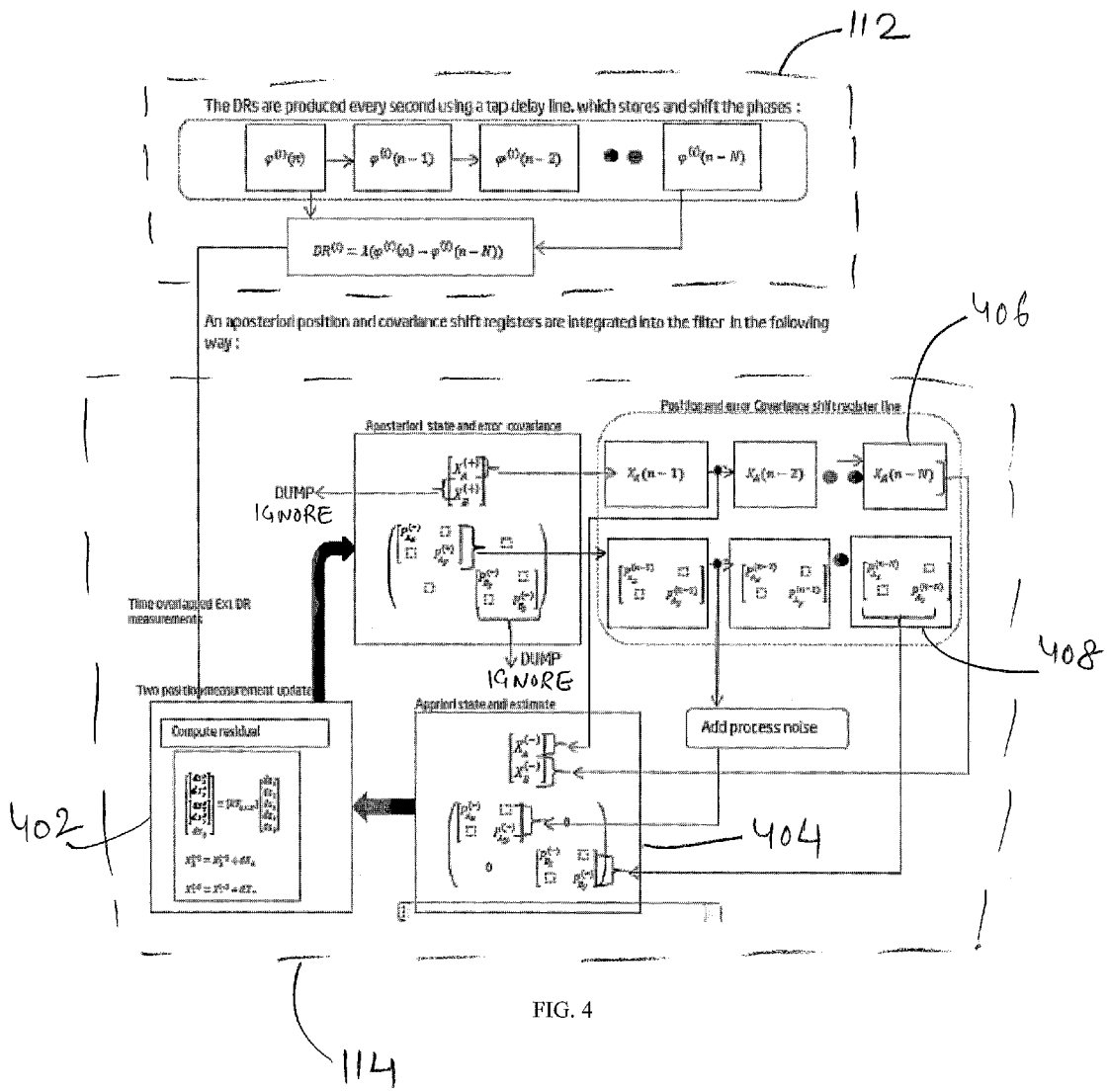
FIG. 4 illustrates an example of implementation architecture of one estimation filter, in accordance with various aspects and principles of the present disclosure.

FIG. 4 illustrates an example of implementation architecture for filter 114. As shown, filter 114 receives DR measurements from DRM module 112, and at an estimation update module 402, uses those measurements along with the a priori or previous position and error covariance estimates from previous estimate module 404 to obtain a posteriori estimates of the positions $X_A$ and $X_B$ and their respective error covariance, in accordance with eqs. (5)-(11) above. Further, as shown, the a posteriori estimates of the position $X_B$ and its error covariance are ignored (or "DUMPED") for propagation purposes, and the a posteriori estimates of the position $X_A$ and its error covariance are stored in shift registers 406, 408 (each of length N), respectively. The stored estimates of the positions and error covariance are propagated or updated within the respective shift registers (during each iteration), in accordance with eq. (12)-(16) above, and are then accessed and used as a priori position and error covariance estimates for subsequent estimation iterations at filter 114.

Referring now to extended velocity filter 116 in FIG. 1—with respect to the operation of filter 116 as a Kalman filter, the "states" of the filter which are continuously estimated (and updated) by the filter 116 are position $X_c$ and "extended velocity" $V_c$. The position $X_c$ may correspond to the position $X_B$ described above, and the extended velocity $V_c$ may be equal to the difference of the positions $X_A$ and $X_B$ (i.e., $X_A - X_B$).

For filter 116's operation, (similar to filter 114's operation) we consider, as a non-limiting embodiment, that the user location/position is determined using two dimensional coordinates, and DR measurements between device 102 and each of five satellites 106 (as computed by one or more ORM modules 112) are involved in determining user position and extended velocity using filter 116. The user may be a walking pedestrian user or a user in a moving vehicle.

Following is a description of a mathematical structure based on which filter 116 is able to compute estimates of user position ($X_C$) and extended velocity ($V_C$), for a current estimation cycle or iteration of the filter, using current DR measurements from DRM module(s) 112 and previous (or a priori) estimates of the user position and extended velocity computed in prior estimation cycle(s) of the filter 116.

Filter states (in two dimensions x and y) for time instants A and B are defined as follows:

$$\begin{bmatrix} x_x^c \\ x_y^c \\ v_x^c \\ v_y^c \\ d \end{bmatrix} = \begin{bmatrix} x \text{ coordinate of position } B \\ y \text{ coordinate of position } B \\ x \text{ coordinate of difference vector between position } A \text{ and } B \\ y \text{ coordinate of difference vector between position } A \text{ and } B \\ \text{Clock drift} \end{bmatrix} \quad (17)$$

where, individual user position and extended velocity states are defined as:

$$X_c = \begin{bmatrix} x_x^c \\ x_y^c \end{bmatrix}; \; V_c = \begin{bmatrix} v_x^c \\ x_y^c \end{bmatrix}; \; dX_c = \begin{bmatrix} dx_x^c \\ dx_y^c \end{bmatrix}; \; dV_c = \begin{bmatrix} dv_x^c \\ dv_y^c \end{bmatrix}$$

$dX_C$ and $dV_C$ represent the (to-be-determined) amount of change in the estimated values for position $X_C$ and extended velocity $V_C$, respectively, from one estimation cycle (or iteration) of filter 116 to the next. And, "Clock drift" indicates an unknown drifting receiver clock assumed during the DR measurement interval.

Vector of extended time overlapped delta range (DR) residual (for five satellites 106) is defined as:

$$dZ = \begin{bmatrix} dz^{(1)} \\ dz^{(2)} \\ dz^{(3)} \\ dz^{(4)} \\ dz^{(5)} \end{bmatrix}.$$

Line-of-sight (LOS) vectors from $i^{th}$ satellite 106 to position $X_A$ and to position $X_B$ are defined as in eqs. (18) and (19) below:

$$LOS_A^{(i)} = \frac{(S_A^{(i)} - X_A)}{\|(S_A^{(i)} - X_A)\|} = \begin{bmatrix} \frac{(S_{Ax}^{(i)} - x_x^A)}{\|S_A^{(i)} - X_A\|} & \frac{(S_{Ay}^{(i)} - x_y^A)}{\|(S_A^{(i)} - X_A)\|} \end{bmatrix} \quad (18)$$

$$LOS_B^{(i)} = \frac{(S_B^{(i)} - X_B)}{\|(S_B^{(i)} - X_B)\|} = \begin{bmatrix} \frac{(S_{Bx}^{(i)} - x_x^B)}{\|(S_B^{(i)} - X_B)\|} & \frac{(S_{By}^{(i)} - x_y^B)}{\|(S_B^{(i)} - X_B)\|} \end{bmatrix} \quad (19)$$

Linearized DR observation to obtain a solution for unknown delta position and extended velocity parameters ($dX_C$ and $dV_C$ is expressed in eq. (20) below:

$$\begin{bmatrix} LOS_A^1 & (LOA_A^1 - LOS_B^1) & 1 \\ LOS_A^2 & (LOS_A^2 - LOS_B^2) & 1 \\ LOS_A^3 & (LOS_A^3 - LOS_B^3) & 1 \\ LOS_A^4 & (LOS_A^4 - LOS_B^4) & 1 \\ LOS_A^5 & (LOS_A^5 - LOS_B^5) & 1 \end{bmatrix} \begin{bmatrix} \begin{bmatrix} dv_x^c \\ dv_y^c \end{bmatrix} \\ \begin{bmatrix} dx_x^c \\ dx_y^c \end{bmatrix} \\ d \end{bmatrix} = \begin{bmatrix} dz^{(1)} \\ dz^{(2)} \\ dz^{(3)} \\ dz^{(4)} \\ dz^{(5)} \end{bmatrix} \quad (20)$$

where, LOS vectors in eq. (20) are computed using eqs. (18) and (19), and dZ is the residual vector calculated according to eq. (21) below:

$$dz^{(i)} = DR^{(i)} - (\|S^{(i)} - (X_C^{(-)} + V^{(-)})\| - \|S^{(i)} - X_C^{(-1)}\|) \quad (21)$$

Thus, as is clear from eq. (21), the residual vector dZ is computed based on the measured DR from DRM module 112, and a priori estimates of position $X_C$ and extended velocity $V_C$. The a priori estimates are basically the position and extended velocity estimates computed by filter 116 in a previous estimation cycle or iteration (e.g., from the immediate prior iteration and/or from N iterations ago). The a priori position and extended velocity estimates for a plurality of (prior) consecutive cycles or iterations may be stored in respective shift registers, and accessed from the shift registers during each estimation cycle to provide to filter 116, e.g., for use in computing eqs. (20) and (21) above.

Accordingly, using the LOS vectors and the solution of eq. (21) for the residual vector dZ, a solution for eq. (20) is computed within filter 116 to determine the delta or change in the position and extended velocity parameters, i.e., $dX_C$ and $dV_C$. This is done based on "KF set of equations" (discussed above), which takes into account the a priori state and a priori state error covariance estimates. Filter 116 then uses the determined dXc and dVc parameters to update the previous or a priori position and extended velocity estimates, $X_C^{(-)}$ and $V^{(-)}$, and obtain current or a posteriori position and extended velocity estimates, $X_C^{(+)}$ and $V_C^{(+)}$, for the current estimation cycle or iteration.

In a continuous filtering operation such as in filter 116, a temporal propagation relation between the filter states of successive iterations may be established. The temporal propagation relation for $V_C$ is defined in eq. (22) below:

$$V_C^{(-)}(n) = V_C^{(+)}(n-1) + q_v(n) \quad (22)$$

where, $q_v(n)$ is the extended velocity process noise component, which may be modeled in the error covariance propagation model discussed below. A non-limiting assumption with respect to eq. (22) is the extended velocity is for slowly random walking, which is geometrically consistent with a slow regular velocity random walking user.

Further, the temporal propagation relation for $X_C$ is defined in eq. (23) below:

$$X_C^{(-)}n = (X_C^{(+)}(n-N) + V_C^{(+)}(n-N) \quad (23).$$

With regard to error covariance propagation, the estimated state vector error for a priori nth iteration is denoted as $$\begin{bmatrix} X_c^{(=)}(n) \\ V_c^{(=)}(n) \end{bmatrix}.$$

And, the a priori error covariance for the nth iteration is defined as in eq. (24):

$$P^{(-)}(n) = E\left\{ \begin{bmatrix} X_c^{(=)}(n) \\ X_c^{(=)}(n) \end{bmatrix} [X_c^{(=)}(n) \; V_c^{(=)}(n)] \right\} = \begin{bmatrix} P_x^{(-)}(n) & P_{xv}^{(-)}(n) \\ P_{xv}^{(-)}(n) & P_v^{(-)}(n) \end{bmatrix} \quad (24)$$

Expanding the elements of the error co-valiance matrix in eq. (24), we get the following equations:

$$E\{X_C^{(-)}(n)X_C^{(-)}(n)^T\} = E\{X_C^{(+)}(n-N)X_C^{(+)T}\} + E\{V^+(n-N)V^+(n-N)^T\} + 2E\{X_C^{(+)}(n-N)V^{(+)}(n-N)^T\}$$

$$E\{V_C^{(-)}(n)V_C^{(-)}(n)^T\}=E\{V_C^{(+)}(n-1)V_C^{(+)}(n-1)\}+E\{q_v(n)q_v(n)^T\}E\{X_n^{(-)}(n)V_C^{(-)}(n)^T\}=0 \quad (25)$$

Accordingly, based on eqs. (24) and (25), the propagation law is defined in the following eq. (26):

$$P^{(-)}(n) = \begin{bmatrix} P_x^{(-)}(n) & P_{xv}^{(-)}(n) \\ P_{xv}^{(-)}(n) & P_v^{(-)}(n) \end{bmatrix} = \quad (26)$$

$$\begin{bmatrix} P_x^{(+)}(n-N) + P_v^{(+)}(n-N) + 2*P_{xv}^{(+)}(n-N) & 0 \\ 0 & P_v^{(+)}(n-1) \end{bmatrix} + \begin{bmatrix} 0 & 0 \\ 0 & Q \end{bmatrix}$$

$$Q = E\{q_v(n)q_v(n)^T\}$$

In some embodiments, the error covariance related to position $X_C$ and extended velocity $V_C$ obtained from a plurality of consecutive (N) estimation iterations (based on eq. (24)) may be stored in respective shift registers (and accessed on demand during the filtering process).

In some embodiments a simpler temporal propagation rule may be adapted than that defined in eq. (26)—which simply adds process noise to both a priori position states. This entails adding process noise component to both position $X_A$ error covariance (upper left sub-matrix in eq. (26)) and position $X_B$ error covariance (bottom right sub-matrix in eq. (26)), instead of propagating (or overwriting) position Xs covariance with the a posteriori error covariance estimate for position $X_A$ computed in the $(n-N)^{th}$ iteration. Such an embodiment may be less optimal in filtering compared to eq. (26), but may be used in applications where the extra memory and processing required by the shift register architecture are considered excessive. In some embodiments the cross correlation terms between position $X_A$ and position $X_B$ in eq. (16) are not zeroed out, but kept intact as a priori statistics for the next delta range measurement update.

Figure 5:
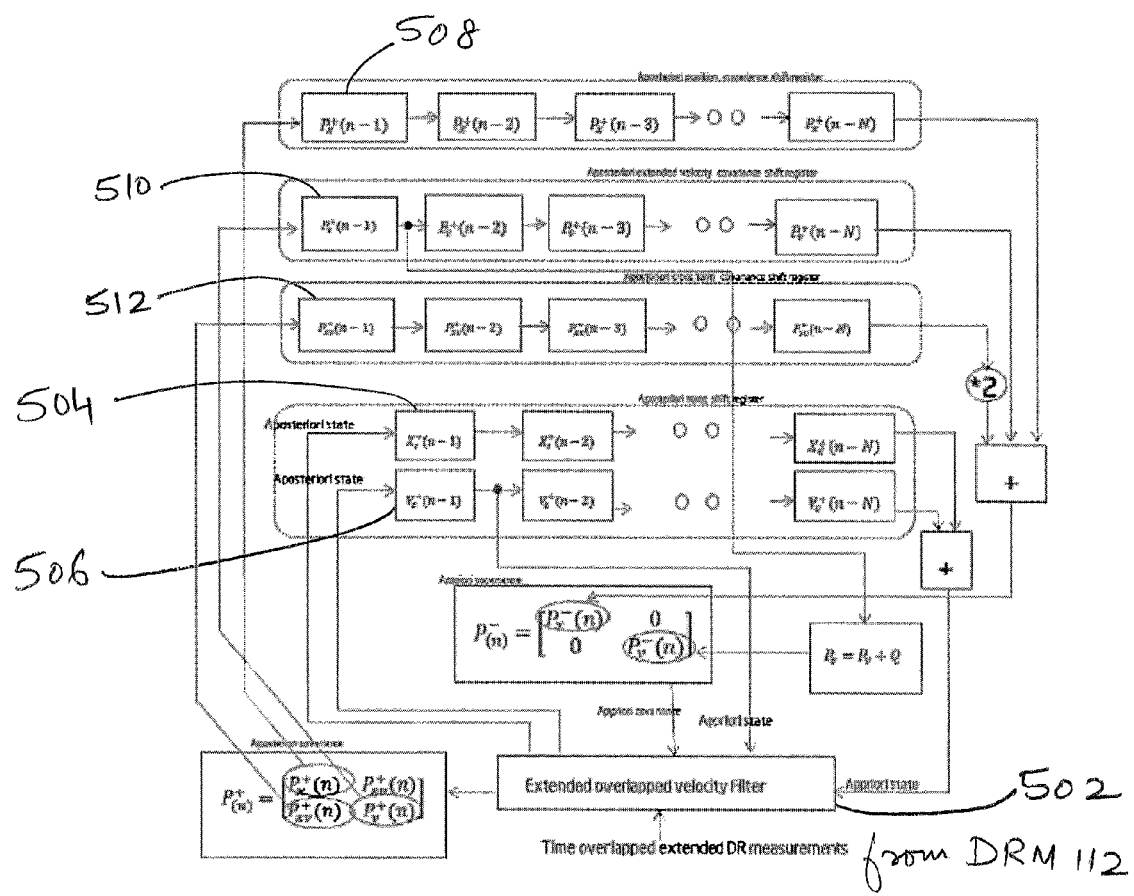
FIG. 5 illustrates an example of implementation architecture of another estimation filter, in accordance with various aspects and principles of the present disclosure.

FIG. 5 illustrates an example of implementation architecture for filter 116. As shown, filter 116 receives DR measurements from DRM module 112, and at an estimation update module 502, uses those measurements along with the a priori or previous position, extended velocity, and error covariance estimates to obtain a posteriori estimates of the position $X_C$ and $V_C$ and their respective error covariance, in accordance with eqs. (17)-(21) described above. Further, as shown, the a posteriori estimates of the position $X_C$ and the a posteriori estimates of the extended velocity $V_C$ are stored in shift registers 504, 506 (each of length N), respectively. Similarly, error covariance for $X_C$ and $X_V$ and their cross term covariance are stored in shift registers 508, 510, 512 (each of length N), respectively. The stored estimates of position, extended velocity, and error covariance are propagated or updated within the respective shift registers (during each iteration), in accordance with eq. (22)-(26) above, and are then accessed and used as a priori position, extended velocity, and error covariance estimates for subsequent estimation iterations at filter 116.

It should be understood that both filters 114, 116 described herein may be integrated with or in relation to a conventional GPS device such that filter 114 or 116 may accept, using appropriately defined observation equation and/or temporal propagation law, the update of conventional range and Doppler measurements, in addition to extended overlapped delta range measurements discussed above.

Examples

The following examples pertain to further embodiments.

Example 1 is a device comprising a delta range measurement (DRM) module and a filter. The DRM module is configured to measure a range difference value between a first range value related to a first time instant and a second range value related to a second time instant, wherein the first and second range values indicate spatial relationships between the device and a navigation satellite at respectively the first and second time instant. The time period between the first time instant and the second time instant may be greater than a periodic interval at which a range value is updated. The filter is configured to compute, for a first cycle, a current estimate of a position of the device based at least on the range difference value and an a priori estimate of the position of the device.

In Example 2, the subject matter of Example 1 may optionally include that, for the first cycle, the filter is configured to compute a current estimate of a first position of the device and a current estimate of a second position of the device, wherein the first and second position current estimates are computed based at least on the range difference value and a priori estimates of the first and second positions.

In Example 3, the subject matter of Example 2 may optionally include that the first and second position current estimates are computed further based on a line-of-sight (LOS) distance vector between the satellite and the first position and a LOS distance vector between the satellite and the second position.

In Example 4, the subject matter of Example 3 may optionally include that the first and second position current estimates are computed further based on a priori estimates of error covariance related to the first and second positions, and the filter is further configured to provide current estimates of the error covariance related to the first and second positions.

In Example 5, the subject matter of Example 4 may optionally include that, for the first cycle, the a priori estimate of the first position is based on the current estimate of the first position computed during a second cycle, wherein the second cycle occurred immediately prior to the first cycle, and the a priori estimate of the second position is based on the current estimate of the first position computed during a third cycle. The third cycle occurs prior to the first cycle, and the time period between the third cycle and the first cycle is associated with the time period between the first time instant and the second time instant.

In Example 6, the subject matter of Example 5 may optionally include a first shift register to store current estimates of the first position computed during a plurality of consecutive cycles.

In Example 7, the subject matter of Example 5 may optionally include that, for the first cycle, the a priori estimate of the error covariance related to the first position is based on the current estimate of the error covariance related to the first position computed during the second cycle, and the a priori estimate of the error covariance related to the second position is based on the current estimate of the error covariance related to the first position computed during the third cycle.

In Example 8, the subject matter of Example 7 may optionally include a second shift register to store current estimates of the error covariance related to the first position computed during a plurality of consecutive cycles.

In Example 9, the subject matter of Example 1 may optionally include that, for the first cycle, the filter is configured to compute a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 10, the subject matter of Example 9 may optionally include that the current estimate of the position difference and the current estimate of the second position are computed further based on a line-of-sight (LOS) distance vector between the satellite and the first position and a LOS distance vector between the satellite and the second position.

In Example 11, the subject matter of Example 10 may optionally include that the current estimate of the position difference and the current estimate of the second position are computed further based on a priori estimates of error covariance related to the position difference and the second position, and the filter is further configured to provide current estimates of the error covariance related to the position difference and the second position.

In Example 12, the subject matter of Example 11 may optionally include that, for the first cycle, the a priori estimate of the position difference is based on the current estimate of the position difference computed during a second cycle, wherein the second cycle occurred immediately prior to the first cycle, and the a priori estimate of the second position is based on a combination of the current estimate of the position difference computed during a third cycle and the current estimate of the second position computed during the third cycle. The third cycle occurs prior to the first cycle, and the time period between the third cycle and the first cycle is associated with the time period between the first time instant and the second time instant.

In Example 13, the subject matter of Example 12 may optionally include a first shift register to store current estimates of the position difference computed during a plurality of consecutive cycles; and a second shift register to store current estimates of the second position computed.

In Example 14, the subject matter of Example 12 may optionally include that, for the first cycle, the a priori estimate of the error covariance related to the position difference is based on the current estimate of the error covariance related to the position difference computed during the second cycle, and the a priori estimate of the error covariance related to the second position is based on a combination of the current estimates of the error covariance related to the position difference computed during the third cycle and the current estimates of the error covariance related to the second position computed during the third cycle.

In Example 15, the subject matter of Example 14 may optionally include a third shift register to store current estimates of the error covariance related to the position difference computed during a plurality of consecutive cycles; a fourth shift register to store current estimates of the error covariance related to the second position computed during the plurality of consecutive cycles; and a fifth shift register to store current estimates of the cross error covariance related to the position difference and the second position computed during the plurality of consecutive cycles.

In Example 16, the subject matter of Example 1 may optionally include that the filter comprises a Kalman filter.

In Example 17, the subject matter of Example 1 may optionally include that the range difference value is based at least on a difference of a phase of a carrier signal associated with the satellite at the first time instant and the phase of the carrier signal at the second time instant.

In Example 18, the subject matter of Example 17 may optionally include that the range difference value is further based on a wavelength of the carrier signal.

In Example 19, the subject matter of Example 17 may optionally include a shift register to store the phases of the carrier signal determined at a plurality of consecutive time instants.

In Example 20, the subject matter of Example 17 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 21 is a method comprising measuring, by a processor, a range difference value between a first range value related to a first time instant and a second range value related to a second time instant, wherein the first and second range values indicate spatial relationships between the device and a navigation satellite at respectively the first and second time instants, and wherein the time period between the first time instant and the second time instant is greater than a periodic interval at which a range value is updated; and computing, by the processor, for a first estimation cycle, a current estimate of a position of the device based at least on the range difference value and an a priori estimate of the position of the device.

In Example 22, the subject matter of Example 21 may optionally include, for the first estimation cycle, said computing a current estimate comprises computing a current estimate of a first position of the device and a current estimate of a second position of the device. The first and second position current estimates are computed based at least on the range difference value and a priori estimates of the first and second positions.

In Example 23, the subject matter of Example 22 may optionally include that, for the first estimation cycle, the a priori estimate of the first position is based on the current estimate of the first position computed during a second estimation cycle, wherein the second estimation cycle occurred immediately prior to the first cycle, and the a priori estimate of the second position is based on the current estimate of the first position computed during a third estimation cycle. The third estimation cycle occurs prior to the first estimation cycle, and the time period between the first and third estimation cycles is associated with the time period between the first and second time instants.

In Example 24, the subject matter of Example 23 may optionally include storing, in a first shift register, current estimates of the first position computed during a plurality of consecutive estimation cycles.

In Example 25, the subject matter of Example 21 may optionally include that for the first estimation cycle, said computing a current estimate comprises computing a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 26, the subject matter of Example 25 may optionally include that, for the first estimation cycle, the a priori estimate of the position difference is based on the current estimate of the position difference computed during a second estimation cycle, wherein the second estimation cycle occurred immediately prior to the first cycle, and the a priori estimate of the second position is based on a combination of the current estimate of the position difference computed during a third estimation cycle and the current estimate of the second position computed during the third estimation cycle. The third estimation cycle occurred prior to the first estimation cycle, and the time period between the first and third cycles is associated with the time period between the first and second time instants.

In Example 27, the subject matter of Example 26 may optionally include storing, in a first shift register, current estimates of the position difference computed during a plurality of consecutive estimation cycles; and storing, in a second shift register, current estimates of the second position computed during the plurality of consecutive estimation cycles.

In Example 28, the subject matter of Example 21 may optionally include that the computing a current estimate of a position of the device filter is based on a Kalman filtering technique.

In Example 29, the subject matter of Example 21 may optionally include that the range difference value is based at least on a difference of a phase of a carrier signal associated with the satellite at the first time instant and the phase of the carrier signal at the second time instant.

In Example 30, the subject matter of Example 29 may optionally include that the range difference value is further based on a wavelength of the carrier signal.

In Example 31, the subject matter of Example 29 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 32 is a computer-readable medium comprising computer-readable instructions physically embodied thereon which, when executed by a processor, causes the processor to perform a plurality of operations comprising measuring a range difference value between a first range value related to a first time instant and a second range value related to a second time instant, wherein the first and second range values indicate spatial relationships between the device and a navigation satellite at respectively the first and second time instants, and wherein the time period between the first time instant and the second time instant is greater than a periodic interval at which a range value is updated; and computing, for a first estimation cycle, a current estimate of a position of the device based at least on the range difference value and an a priori estimate of the position of the device.

In Example 33, the subject matter of Example 32 may optionally include, for the first estimation cycle, said computing a current estimate comprises computing a current estimate of a first position of the device and a current estimate of a second position of the device. The first and second position current estimates are computed based at least on the range difference value and a priori estimates of the first and second positions.

In Example 34, the subject matter of Example 33 may optionally include that, for the first estimation cycle, the a priori estimate of the first position is based on the current estimate of the first position computed during a second estimation cycle, wherein the second estimation cycle occurred immediately prior to the first cycle, and the a priori estimate of the second position is based on the current estimate of the first position computed during a third estimation cycle. The third estimation cycle occurs prior to the first estimation cycle, and the time period between the first and third estimation cycles is associated with the time period between the first and second time instants.

In Example 35, the subject matter of Example 34 may optionally include storing, in a first shift register, current estimates of the first position computed during a plurality of consecutive estimation cycles.

In Example 36, the subject matter of Example 32 may optionally include that for the first estimation cycle, said computing a current estimate comprises computing a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 37, the subject matter of Example 36 may optionally include that, for the first estimation cycle, the a priori estimate of the position difference is based on the current estimate of the position difference computed during a second estimation cycle, wherein the second estimation cycle occurred immediately prior to the first cycle, and the a priori estimate of the second position is based on a combination of the current estimate of the position difference computed during a third estimation cycle and the current estimate of the second position computed during the third estimation cycle. The third estimation cycle occurred prior to the first estimation cycle, and the time period between the first and third cycles is associated with the time period between the first and second time instants.

In Example 38, the subject matter of Example 37 may optionally include storing, in a first shift register, current estimates of the position difference computed during a plurality of consecutive estimation cycles; and storing, in a second shift register, current estimates of the second position computed during the plurality of consecutive estimation cycles.

In Example 39, the subject matter of Example 32 may optionally include that the computing a current estimate of a position of the device filter is based on a Kalman filtering technique.

In Example 40, the subject matter of Example 32 may optionally include that the range difference value is based at least on a difference of a phase of a carrier signal associated with the satellite at the first time instant and the phase of the carrier signal at the second time instant.

In Example 41, the subject matter of Example 40 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 42 is a device comprising a delta range measurement (DRM) module and a filter. The DRM module is configured to measure a range difference value between a first range value related to a first time instant and a second range value related to a second time instant, wherein the first and second range values indicate spatial relationships between the device and a navigation satellite at respectively the first and second time instant. The time period between the first time instant and the second time instant may be greater than a periodic interval at which a range value is updated. The filter is configured to compute, for a first cycle, a current estimate of a position of the device based at least on the range difference value and an a priori estimate of the position of the device.

In Example 43, the subject matter of Example 42 may optionally include that, for the first cycle, the filter is configured to compute a current estimate of a first position of the device and a current estimate of a second position of the device, wherein the first and second position current estimates are computed based at least on the range difference value and a priori estimates of the first and second positions.

In Example 44, the subject matter of Example 43 may optionally include that the first and second position current estimates are computed further based on a line-of-sight (LOS) distance vector between the satellite and the first position and a LOS distance vector between the satellite and the second position.

In Example 45, the subject matter of Example 44 may optionally include that the first and second position current estimates are computed further based on a priori estimates of error covariance related to the first and second positions, and the filter is further configured to provide current estimates of the error covariance related to the first and second positions.

In Example 46, the subject matter of Example 45 may optionally include that, for the first cycle, the a priori estimate of the first position is based on the current estimate of the first position computed during a second cycle, wherein the second cycle occurred immediately prior to the first cycle, and the a priori estimate of the second position is based on the current estimate of the first position computed during a third cycle. The third cycle occurs prior to the first cycle, and the time period between the third cycle and the first cycle is associated with the time period between the first time instant and the second time instant.

In Example 47, the subject matter of Example 46 may optionally include a first shift register to store current estimates of the first position computed during a plurality of consecutive cycles.

In Example 48, the subject matter of Example 46 may optionally include that, for the first cycle, the a priori estimate of the error covariance related to the first position is based on the current estimate of the error covariance related to the first position computed during the second cycle, and the a priori estimate of the error covariance related to the second position is based on the current estimate of the error covariance related to the first position computed during the third cycle.

In Example 49, the subject matter of Example 48 may optionally include a second shift register to store current estimates of the error covariance related to the first position computed during a plurality of consecutive cycles.

In Example 50, the subject matter of Example 42 may optionally include that, for the first cycle, the filter is configured to compute a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 51, the subject matter of Example 50 may optionally include that the current estimate of the position difference and the current estimate of the second position are computed further based on a line-of-sight (LOS) distance vector between the satellite and the first position and a LOS distance vector between the satellite and the second position.

In Example 52, the subject matter of Example 51 may optionally include that the current estimate of the position difference and the current estimate of the second position are computed further based on a priori estimates of error covariance related to the position difference and the second position, and the filter is further configured to provide current estimates of the error covariance related to the position difference and the second position.

In Example 53, the subject matter of Example 52 may optionally include that, for the first cycle, the a priori estimate of the position difference is based on the current estimate of the position difference computed during a second cycle, wherein the second cycle occurred immediately prior to the first cycle, and the a priori estimate of the second position is based on a combination of the current estimate of the position difference computed during a third cycle and the current estimate of the second position computed during the third cycle. The third cycle occurs prior to the first cycle, and the time period between the third cycle and the first cycle is associated with the time period between the first time instant and the second time instant.

In Example 54, the subject matter of Example 53 may optionally include a first shift register to store current estimates of the position difference computed during a plurality of consecutive cycles; and a second shift register to store current estimates of the second position computed.

In Example 55, the subject matter of Example 53 may optionally include that, for the first cycle, the a priori estimate of the error covariance related to the position difference is based on the current estimate of the error covariance related to the position difference computed during the second cycle, and the a priori estimate of the error covariance related to the second position is based on a combination of the current estimates of the error covariance related to the position difference computed during the third cycle and the current estimates of the error covariance related to the second position computed during the third cycle.

In Example 56, the subject matter of Example 55 may optionally include a third shift register to store current estimates of the error covariance related to the position difference computed during a plurality of consecutive cycles; a fourth shift register to store current estimates of the error covariance related to the second position computed during the plurality of consecutive cycles; and a fifth shift register to store current estimates of the cross error covariance related to the position difference and the second position computed during the plurality of consecutive cycles.

In Example 57, the subject matter of Example 42 may optionally include that the filter comprises a Kalman filter.

In Example 58, the subject matter of Example 42 may optionally include that the range difference value is based at least on a difference of a phase of a carrier signal associated with the satellite at the first time instant and the phase of the carrier signal at the second time instant.

In Example 59, the subject matter of Example 58 may optionally include that the range difference value is further based on a wavelength of the carrier signal.

In Example 60, the subject matter of Example 58 may optionally include a shift register to store the phases of the carrier signal determined at a plurality of consecutive time instants.

In Example 61, the subject matter of Example 58 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 62 is a method to estimate position of a receiver, the method comprising realizing or using the device of any one of Examples 42 through 61.

Example 63 is a computer-readable medium comprising computer-readable instructions physically embodied thereon which, when executed by a processor, causes the processor to realize or use the device of any one of Examples 42 through 61.

Example 64 is an apparatus comprising means for measuring a range difference value between a first range value related to a first time instant and a second range value related to a second time instant, wherein the first and second range values indicate spatial relationships between the device and a navigation satellite at respectively the first and second time instants, and wherein the time period between the first time instant and the second time instant is greater than a periodic interval at which a range value is updated; and means for computing, for a first cycle, a current estimate of a position of the device based at least on the range difference value and an a priori estimate of the position of the device.

In Example 66, the subject matter of Example 64 may optionally include that the means for computing comprising means for computing a current estimate of a first position of the device and a current estimate of a second position of the device, based at least on the range difference value and a priori estimates of the first and second positions.

In Example 67, the subject matter of Example 64 may optionally include that the means for computing comprising means for computing a current estimate of a position difference between a first position of the device and a second position of the device, and a current estimate of the second position of the device, based at least on the range difference value and a priori estimates of the position difference and the second position.

Example 68 is a device comprising a delta range measurement (DRM) module and a filter. The DRM module is configured to measure a range difference value between a first range value related to a first time instant and a second range value related to a second time instant, wherein the first and second range values indicate spatial relationships between the device and a navigation satellite at respectively the first and second time instant. The time period between the first time instant and the second time instant may be greater than a periodic interval at which a range value is updated. The filter is configured to compute, for a first cycle, a current estimate of a position of the device based at least on the range difference value and an a priori estimate of the position of the device.

In Example 69, the subject matter of Example 68 may optionally include that, for the first cycle, the filter is configured to compute a current estimate of a first position of the device and a current estimate of a second position of the device, wherein the first and second position current estimates are computed based at least on the range difference value and a priori estimates of the first and second positions.

In Example 70, the subject matter of Example 69 may optionally include that the first and second position current estimates are computed further based on a line-of-sight (LOS) distance vector between the satellite and the first position and a LOS distance vector between the satellite and the second position.

In Example 71, the subject matter of Example 70 may optionally include that the first and second position current estimates are computed further based on a priori estimates of error covariance related to the first and second positions, and the filter is further configured to provide current estimates of the error covariance related to the first and second positions.

In Example 72, the subject matter of Example 71 may optionally include that, for the first cycle, the a priori estimate of the first position is based on the current estimate of the first position computed during a second cycle, wherein the second cycle occurred immediately prior to the first cycle, and the a priori estimate of the second position is based on the current estimate of the first position computed during a third cycle. The third cycle occurs prior to the first cycle, and the time period between the third cycle and the first cycle is associated with the time period between the first time instant and the second time instant.

In Example 73, the subject matter of Example 72 may optionally include a first shift register to store current estimates of the first position computed during a plurality of consecutive cycles.

In Example 74, the subject matter of Example 72 may optionally include that, for the first cycle, the a priori estimate of the error covariance related to the first position is based on the current estimate of the error covariance related to the first position computed during the second cycle, and the a priori estimate of the error covariance related to the second position is based on the current estimate of the error covariance related to the first position computed during the third cycle.

In Example 75, the subject matter of Example 74 may optionally include a second shift register to store current estimates of the error covariance related to the first position computed during a plurality of consecutive cycles.

In Example 76, the subject matter of Example 74 may optionally include that, for the first cycle, the filter is configured to compute a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 77, the subject matter of Example 76 may optionally include that the current estimate of the position difference and the current estimate of the second position are computed further based on a line-of-sight (LOS) distance vector between the satellite and the first position and a LOS distance vector between the satellite and the second position.

In Example 78, the subject matter of Example 77 may optionally include that the current estimate of the position difference and the current estimate of the second position are computed further based on a priori estimates of error covariance related to the position difference and the second position, and the filter is further configured to provide current estimates of the error covariance related to the position difference and the second position.

In Example 79, the subject matter of Example 78 may optionally include that, for the first cycle, the a priori estimate of the position difference is based on the current estimate of the position difference computed during a second cycle, wherein the second cycle occurred immediately prior to the first cycle, and the a priori estimate of the second position is based on a combination of the current estimate of the position difference computed during a third cycle and the current estimate of the second position computed during the third cycle. The third cycle occurs prior to the first cycle, and the time period between the third cycle and the first cycle is associated with the time period between the first time instant and the second time instant.

In Example 80, the subject matter of Example 79 may optionally include a first shift register to store current estimates of the position difference computed during a plurality of consecutive cycles; and a second shift register to store current estimates of the second position computed.

In Example 81, the subject matter of Example 79 may optionally include that, for the first cycle, the a priori estimate of the error covariance related to the position difference is based on the current estimate of the error covariance related to the position difference computed during the second cycle, and the a priori estimate of the error covariance related to the second position is based on a combination of the current estimates of the error covariance related to the position difference computed during the third cycle and the current estimates of the error covariance related to the second position computed during the third cycle.

In Example 82, the subject matter of Example 81 may optionally include a third shift register to store current estimates of the error covariance related to the position difference computed during a plurality of consecutive cycles; a fourth shift register to store current estimates of the error covariance related to the second position computed during the plurality of consecutive cycles; and a fifth shift register to store current estimates of the cross error covariance related to the position difference and the second position computed during the plurality of consecutive cycles.

In Example 83, the subject matter of Example 68 may optionally include that the filter comprises a Kalman filter.

In Example 84, the subject matter of Example 68 may optionally include that the range difference value is based at least on a difference of a phase of a carrier signal associated with the satellite at the first time instant and the phase of the carrier signal at the second time instant.

In Example 85, the subject matter of Example 84 may optionally include that the range difference value is further based on a wavelength of the carrier signal.

In Example 86, the subject matter of Example 84 may optionally include a shift register to store the phases of the carrier signal determined at a plurality of consecutive time instants.

In Example 87, the subject matter of Example 84 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 88 is a method to estimate position of a receiver, the method comprising realizing or using the device of any one of Examples 68 through 87.

Example 89 is an apparatus comprising means for measuring a range difference value between a first range value related to a first time instant and a second range value related to a second time instant, wherein the first and second range values indicate spatial relationships between the device and a navigation satellite at respectively the first and second time instants, and wherein the time period between the first time instant and the second time instant is greater than a periodic interval at which a range value is updated; and means for computing, for a first cycle, a current estimate of a position of the device based at least on the range difference value and an a priori estimate of the position of the device.

In Example 90, the subject matter of Example 89 may optionally include that the means for computing comprising means for computing a current estimate of a first position of the device and a current estimate of a second position of the device, based at least on the range difference value and a priori estimates of the first and second positions.

In Example 91, the subject matter of Example 89 may optionally include that the means for computing comprising means for computing a current estimate of a position difference between a first position of the device and a second position of the device, and a current estimate of the second position of the device, based at least on the range difference value and a priori estimates of the position difference and the second position.

Example 92 is a computer-readable medium comprising computer-readable instructions physically embodied thereon which, when executed by a processor, causes the processor to realize or use the apparatus of any one of Examples 89 through 91.

Example 93 is a device comprising a delta range measurement (DRM) module and a filter. The DRM module is configured to measure a range difference value between a first range value related to a first time instant and a second range value related to a second time instant, wherein the first and second range values indicate spatial relationships between the device and a navigation satellite at respectively the first and second time instant. The time period between the first time instant and the second time instant may be greater than a periodic interval at which a range value is updated. The filter is configured to compute, for a first cycle, a current estimate of a position of the device based at least on the range difference value and an a priori estimate of the position of the device.

In Example 94, the subject matter of Example 93 may optionally include that, for the first cycle, the filter is configured to compute a current estimate of a first position of the device and a current estimate of a second position of the device, wherein the first and second position current estimates are computed based at least on the range difference value and a priori estimates of the first and second positions.

In Example 95, the subject matter of Example 94 may optionally include that the first and second position current estimates are computed further based on a line-of-sight (LOS) distance vector between the satellite and the first position and a LOS distance vector between the satellite and the second position.

In Example 96, the subject matter of Example 94 or Example 95 may optionally include that, for the first cycle, the a priori estimate of the first position is based on the current estimate of the first position computed during a second cycle, wherein the second cycle occurred immediately prior to the first cycle, and the a priori estimate of the second position is based on the current estimate of the first position computed during a third cycle. The third cycle occurs prior to the first cycle, and the time period between the third cycle and the first cycle is associated with the time period between the first time instant and the second time instant.

In Example 97, the subject matter of any of Examples 94 through 96 may optionally include a first shift register to store current estimates of the first position computed during a plurality of consecutive cycles.

In Example 98, the subject matter of Example 93 may optionally include that, for the first cycle, the filter is configured to compute a current estimate of a position difference between a first position of the device and a second position of the device, and a current estimate of the second position of the device. The current estimate of the position difference and the current estimate of the second position are computed based at least on the range difference value and a priori estimates of the position difference and the second position.

In Example 99, the subject matter of Example 98 may optionally include that the current estimate of the position difference and the current estimate of the second position are computed further based on a line-of-sight (LOS) distance vector between the satellite and the first position and a LOS distance vector between the satellite and the second position.

In Example 100, the subject matter of Example 98 or Example 99 may optionally include that, for the first cycle, the a priori estimate of the position difference is based on the current estimate of the position difference computed during a second cycle, wherein the second cycle occurred immediately prior to the first cycle, and the a priori estimate of the second position is based on a combination of the current estimate of the position difference computed during a third cycle and the current estimate of the second position computed during the third cycle. The third cycle occurs prior to the first cycle, and the time period between the third cycle and the first cycle is associated with the time period between the first time instant and the second time instant.

In Example 101, the subject matter of any one of Examples 98 through 100 may optionally include a first shift register to store current estimates of the position difference computed during a plurality of consecutive cycles; and a second shift register to store current estimates of the second position computed.

In Example 102, the subject matter of any one of Examples 93 through 101 may optionally include that the filter comprises a Kalman filter.

In Example 103, the subject matter of any one of Examples 98 through 102 may optionally include that the range difference value is based at least on a difference of a phase of a carrier signal associated with the satellite at the first time instant and the phase of the carrier signal at the second time instant.

In Example 104, the subject matter of Example 103 may optionally include that the periodic interval at which the range value is updated comprises a periodic interval at which a new phase of the carrier signal is sampled, and the time period between the first time instant and the second time instant is greater than the periodic interval at which a new phase of the carrier signal is sampled.

Example 105 is a method to estimate position of a receiver, the method comprising realizing or using the device of any one of Examples 93 through 104.

Example 106 is a computer-readable medium comprising computer-readable instructions physically embodied thereon which, when executed by a processor, causes the processor to perform a method or realize a device as in any of Examples 93 through 105.

Example 107 is an apparatus comprising means for performing a method or realizing a device as in any of Examples 93 through 105.

All optional features of the apparatuses, devices or systems described above may also be implemented with respect to the various methods or processes described herein, and specifics in the above examples may be used anywhere in one or more embodiments.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the terms "logic" and "module" are representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A device configured to communicate wireless signals, the device comprising:
   a GPS receiver configured to communicate satellite signals and measure range values, each range value indicating a spatial relationship between the device and a navigation satellite at a certain time instant;
   a wireless transceiver;
   a delta range measurement (DRM) module and a filter operatively associated with the GPS receiver,
   a memory configured to store information related to an application program; and
   a processor including hardware, the processor configured to receive a position request for a current estimate of a position of the device in relation to the application program, process the position request using the DRM module and the filter, and provide the current estimate of the position of the device for the application program, wherein, in processing the position request, the DRM module is configured to:
  receive, from the GPS receiver, a first range value related to a first time instant and a second range value related to a second time instant, wherein the first and second range values are represented in terms of respective phase values of a carrier signal associated with the navigation satellite at respectively the first and second time instants and the time period between the first time instant and the second time instant is greater than a periodic interval at which a range value is updated and
  measure a range difference value between the first range value and the second range value based on a difference of the respective phase values related to the first and second range values and a wavelength of the carrier signal, and
the filter is configured to compute, for a first cycle, the current estimate of the position of the device based at least on the range difference value and an a priori estimate of the position of the device.

2. The device of claim 1, wherein, for the first cycle,
the filter is configured to compute a first position estimate of a first position of the device and a second position estimate of a second position of the device,
wherein the first and second position estimates are computed based at least on the range difference value and a priori estimates of the first and second positions.

3. The device of claim 2, wherein the first and second position estimates are computed further based on a line-of-sight (LOS) distance vector between the satellite and the first position and a LOS distance vector between the satellite and the second position.

4. The device of claim 3, wherein the first and second position estimates are computed further based on a priori estimates of error covariance related to the first and second positions, and the filter is further configured to provide current estimates of the error covariance related to the first and second positions.

5. The device of claim 4, wherein for the first cycle,
the a priori estimate of the first position is based on a third position estimate of the first position computed during a second cycle, wherein the second cycle occurred immediately prior to the first cycle, and
the a priori estimate of the second position is based on a fourth position estimate of the first position computed during a third cycle,
wherein the third cycle occurred prior to the first cycle, and the time period between the third cycle and the first cycle is associated with the time period between the first time instant and the second time instant.

6. The device of claim 5, further comprising a first shift register to store position estimates of the first position computed during a plurality of consecutive cycles.

7. The device of claim 5, wherein, for the first cycle,
the a priori estimate of the error covariance related to the first position is based on the current estimate of the error covariance related to the first position computed during the second cycle, and
the a priori estimate of the error covariance related to the second position is based on the current estimate of the error covariance related to the first position computed during the third cycle.

8. The device of claim 7, further comprising a second shift register to store current estimates of the error covariance related to the first position computed during a plurality of consecutive cycles.

9. The device of claim 1, wherein, for the first cycle,
the filter is configured to compute a current estimate of a position difference between a first position of the device and a second position of the device, and a current estimate of the second position of the device,
wherein the current estimate of the position difference and the current estimate of the second position are computed based at least on the range difference value and a priori estimates of the position difference and the second position.

10. The device of claim 9, wherein the current estimate of the position difference and the current estimate of the second position are computed further based on a line-of-sight (LOS) distance vector between the satellite and the first position and a LOS distance vector between the satellite and the second position.

11. The device of claim 10, wherein the current estimate of the position difference and the current estimate of the second position are computed further based on a priori estimates of error covariance related to the position difference and the second position, and the filter is further configured to provide current estimates of the error covariance related to the position difference and the second position.

12. The device of claim 11, wherein, for the first cycle,
the a priori estimate of the position difference is based on the current estimate of the position difference computed during a second cycle, wherein the second cycle occurred immediately prior to the first cycle, and
the a priori estimate of the second position is based on a combination of the current estimate of the position difference computed during a third cycle and the current estimate of the second position computed during the third cycle,
wherein the third cycle occurred prior to the first cycle, and the time period between the third cycle and the first cycle is associated with the time period between the first time instant and the second time instant.

13. The device of claim 12, further comprising:
a first shift register to store current estimates of the position difference computed during a plurality of consecutive cycles; and
a second shift register to store current estimates of the second position computed during the plurality of consecutive cycles.

14. The device of claim 12, wherein, for the first cycle,
the a priori estimate of the error covariance related to the position difference is based on the current estimate of the error covariance related to the position difference computed during the second cycle, and
the a priori estimate of the error covariance related to the second position is based on a combination of the current estimates of the error covariance related to the position difference computed during the third cycle and the current estimates of the error covariance related to the second position computed during the third cycle.

15. The device of claim 14, further comprising:
a third shift register to store current estimates of the error covariance related to the position difference computed during a plurality of consecutive cycles;
a fourth shift register to store current estimates of the error covariance related to the second position computed during the plurality of consecutive cycles; and
a fifth shift register to store current estimates of the cross error covariance related to the position difference and the second position computed during the plurality of consecutive cycles.

16. The device of claim 1, wherein the filter comprises a Kalman filter.

17. The device of claim 1, further comprising a shift register to store the phases of the carrier signal determined at a plurality of consecutive time instants.

18. The device of claim 1, wherein the periodic interval at which the range value is updated comprises a periodic interval at which a new phase of the carrier signal is sampled, and the time period between the first time instant and the second time instant is greater than the periodic interval at which a new phase of the carrier signal is sampled.

19. A method to estimate a position of a wireless device comprising a GPS receiver configured to communicate satellite signals, a memory configured to store information related to an application program, and a processor including hardware, the method comprising:

measuring, at the GPS receiver, range values, each range value indicating a spatial relationship between the wireless device and a navigation satellite at a certain time instant;

receiving, at the processor, a position request for a current estimate of a position of the wireless device in relation to the application program;

responsive to the position request, receiving, from the GPS receiver, a first range value related to a first time instant and a second range value related to a second time instant, wherein the first and second range values are represented in terms of respective phase values of a carrier signal associated with the navigation satellite at respectively the first and second time instants and the time period between the first time instant and the second time instant is greater than a periodic interval at which a range value is updated;

obtaining, using the processor, a range difference value between the first range value and the second range value based on a difference of the respective phase values related to the first and second range values and a wavelength of the carrier signal;

computing, for a first cycle, the current estimate of the position of the device based at least on the range difference value and an a priori estimate of the position of the device; and providing the current estimate of the position of the device to the application program.

20. A computer-readable medium comprising computer-readable instructions physically embodied thereon which, when executed by a processor, causes the processor to:

obtain ranges values from a GPS receiver configured to communicate satellite signals, each range value indicating a spatial relationship between a wireless device including the GPS receiver and a navigation satellite at a certain time instant;

receive a position request for a current estimate of a position of the wireless device in relation to an application program associated with the wireless device;

responsive to the position request, receive, from the GPS receiver, a first range value related to a first time instant and a second range value related to a second time instant, wherein the first and second range values are represented in terms of respective phase values of a carrier signal associated with the navigation satellite at respectively the first and second time instants and the time period between the first time instant and the second time instant is greater than a periodic interval at which a range value is updated;

obtain a range difference value between the first range value and the second range value based on a difference of the respective phase values related to the first and second range values and a wavelength of the carrier signal;

compute, for a first cycle, the current estimate of the position of the device based at least on the range difference value and an a priori estimate of the position of the device; and provide the current estimate of the position of the device to the application program.

* * * * *

UNITED STATES PATENT AND TRADEMARK OFFICE
CERTIFICATE OF CORRECTION

PATENT NO.      : 9,733,363 B2
APPLICATION NO. : 14/128022
DATED           : August 15, 2017
INVENTOR(S)     : Tomer Dahan Page 1 of 1

It is certified that error appears in the above-identified patent and that said Letters Patent is hereby corrected as shown below:

In the Claims

In Column 29, Line 41, in Claim 5, before "a", delete "the"

In Column 29, Line 45, in Claim 5, before "a", delete "the"

In Column 29, Line 56, in Claim 7, before "a", delete "the"

In Column 29, Line 60, in Claim 7, before "a", delete "the"

In Column 30, Line 26, in Claim 12, before "a", delete "the"

In Column 30, Line 30, in Claim 12, before "a", delete "the"

In Column 30, Line 47, in Claim 14, before "a", delete "the"

In Column 30, Line 51, in Claim 14, before "a", delete "the"

Signed and Sealed this
Twenty-fourth Day of April, 2018

Andrei Iancu
*Director of the United States Patent and Trademark Office*